June 12, 1962 H. J. JABCZYNSKI ET AL 3,038,968

SYSTEM AND CIRCUIT ARRANGEMENT FOR ROUTING
TELEPHONE CONNECTIONS AND THE LIKE

Filed Sept. 10, 1958 3 Sheets-Sheet 1

Inventors.
Hans Joachim Jabczynski.
Ulrich Körber, &
Dieter Voeglen.
By. [signature] Atty.

Inventors.
Hans Joachim Jabczynski,
Ulrich Körber, &
Dieter Voeglen.
By [signature] Atty.

June 12, 1962 H. J. JABCZYNSKI ETAL 3,038,968

SYSTEM AND CIRCUIT ARRANGEMENT FOR ROUTING
TELEPHONE CONNECTIONS AND THE LIKE

Filed Sept. 10, 1958 3 Sheets-Sheet 3

Inventors.
Hans Joachim Jabczynski,
Ulrich Körber, &
Dieter Voegtlen.
By [signature] Atty.

United States Patent Office 3,038,968

Patented June 12, 1962

3,038,968

SYSTEM AND CIRCUIT ARRANGEMENT FOR ROUTING TELEPHONE CONNECTIONS AND THE LIKE

Hans Joachim Jabczynski, Munich-Solln, and Ulrich Körber and Dieter Voegtlen, both of Munich, Germany, assignors to Siemens und Halske Aktiengesellschaft Berlin and Munich, a corporation of Germany Filed Sept. 10, 1958, Ser. No. 760,238
Claims priority, application Germany Sept. 26, 1957
3 Claims. (Cl. 179—18)

Figure 5:
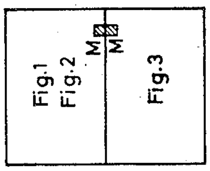

This invention relates to the routing of telephone connections and the like and is particularly concerned with a system and circuit arrangement for selecting connection paths extending over multiplestage fields of coupling points. An example of a three-stage field of coupling points employing in each stage coordinate switches may be had by consulting United States Patent No. 2,779,824. The system according to the invention, which may also be referred to as pathfinder system, makes it possible to select in particularly advantageous manner connection paths in multiple-stage fields of coupling points.

In order to aid the understanding of the invention, known fields of coupling points, referred to, for example, in United States Patent No. 2,843,674 as cross point networks, and herein briefly referred to as coupling fields, will be described first, and thereafter will be described the known systems for building up calls which are of interest in connection therewith.

The coupling points in the individual stages of the coupling field, also referred to as coupling stages, are arranged in coordinate or crossbar fashion. The coupling multiple is formed by coupling points multipled according to lines and columns. The coupling multiple may be employed in conjunction with coordinate switches, for example, crossbar switches, cross-coil switches and relay couplers. At each coupling point, there is a coupling element which assumes operating position responsive to establishing a connection path involving the coupling point. Several so-called coupling point contacts may be set thereby. A coupling multiple has a plurality of inlets and outlets which are respectively distinguished according to location. Corresponding inlets and outlets of different coupling multiples of the same coupling stage have the same position or location. The coupling multiples to which are connected the inputs of the coupling field are also referred to as input coupling multiples and those, to which are connected the outlets are referred to as outlet coupling multiples. The individual coupling stages of the coupling field may contain several coupling multiples and are interconnected in predetermined manner by way of trunk lines which usually have a plurality of conductors, for example, line and private conductors. The disposition of these trunk lines is determined by the grouping plan resulting from theoretical considerations concerning the frequency of calls. If the trunk lines are placed between two neighboring coupling stages so that given coupling multiples of one coupling stage are connected by way of trunk lines exclusively with predetermined coupling multiples of the other coupling stage, and vice versa, these coupling multiples will accordingly for a coupling group extending over two neighboring coupling stages. Within neighboring coupling stages, there will then be several coupling groups. The trunk lines per coupling group are thereby preferably disposed so that at least one trunk line extends from each coupling multiple of one coupling stage to each coupling multiple of the neighboring coupling stage. If a coupling field or cross point network, that is, a multiple-stage field of coupling points is built up in this manner, a plurality of simultaneously occurring calls can be advantageously successively handled without requiring any particular precautions for securing the processing thereof.

The processing or routing of calls is effected by means of a centrally disposed device referred to as a marker. The marker is among others connected with the coupling field or cross point network by way of information lines. Moreover, there must be provided storage devices for receiving the call informations before the routing thereof. Waiting intervals will necessarily occur pending the routing of the stored call data. The waiting interval in the case of telephone systems must not exceed the duration of an interval between dialing, and quick execution of the hunting, selecting and establishing of a connection path is, accordingly, required. This is, among others, achieved by the use of electronic switching means.

Several methods are known for building up connections by way of coupling fields, one phase of the methods (for example, according to United States Patent No. 2,664,467) being characterized by the use of mutually staggered pulses which convey to the marker over information lines the operating condition, idle or busy, of the trunk lines, idle connection paths (trunks) being thereby determined by coincidence of the pulses. The use of the pulses reduces the number of required information lines, since each pulse phase represents a particular information, but a certain waiting time must be interposed to allow for establishing all coincidence possibilities. The processing time is thereby necessarily prolonged. Aside from this disadvantage, such system has the further drawback of requiring due to the use of the pulses, a generator with a multitude of separate outputs, resulting in a relatively great expenditure and in particular requirements for the information lines with respect to the upper limit frequency so as to adapt such lines for transmission of the individual pulses with the required sequence frequency.

The circuit arrangement according to the invention does not use impulse trains or sequences, therefore basically distinguishing from these methods, and the latter therefore need not be further considered.

Of the systems which do not operate with pulses, some (for example, the crossbar system) use information lines for the transmission of the operating condition (busy or idle condition) of the trunk lines to the markers, which select and combine the trunk lines suitable for the extension of the respective calls and select from a number of possible connection paths, one such path to be used for a call. The marker thereupon effects over command control lines the setting of the coupling point contacts at the corresponding coupling points.

Others of those systems (for example, according to United States Patents Nos. 2,686,837 and 2,655,559) do not effect the selection and combination of the trunk lines in the marker, but by means of a special network for the path finding and setting, such network corresponding in its trunk line disposition to that of the coupling field or cross point network and being superimposed thereon as a part thereof. The setting of the coupling point contacts for a selected routing path is carried out by switching means included in such a network. Since these switching means are allotted to individual coupling points or trunk lines, they may be considered as forming part of the coupling field or cross point network. The selection of a routing path, from a number of possible paths, is thereupon effected under control of the marker which is a centrally disposed device.

The known methods of the latter kind proceed from the thought that, regardless whether a connection is to be established to a fixed outlet or in a direction comprising a plurality of outlets, one given inlet (input) and one given outlet (output) of the coupling field are to be marked upon initiating the hunting and selection operation, and an attempt at effecting the extension is then to be made with respect to the corresponding inlet and outlet. The marking of the corresponding inlet and outlet effects incident to the routing attempt a testing concerning the routing possibilities existing between these marked points. For example, in a four-stage coupling field or cross point network, the idle and, accordingly, available trunk line combinations are ascertained by the marking of the inlet thereof, such trunk line combinations leading from such inlet over two coupling stages to an intersection which extends by way of associated trunk lines through the entire coupling field. The idle and, accordingly, available trunk line combinations extending to the intersection from the marked outlet over two coupling stages are simultaneously ascertained in similar manner. Consequently, those of the trunk lines at the intersection which belong to the available combinations, are likewise activated. Some of these trunk lines are thereby marked from the outlet side as well as from the inlet side of the coupling field (cross point network), namely, the trunk lines which lie in the course of a routing path between the marked inlet and the marked outlet. One of these trunk lines is now selected by means of a switch, and the setting of the coupling point contacts belonging to the corresponding routing or connection path is thereupon effected by setting means included in the course of the pathfinder and setting network of the corresponding connection path.

Failure of simultaneously marking at the intersection a trunk line from both sides thereof signifies that there is no possible connection or routing path available between the corresponding inlet and outlet. If it is not necessary to reach a predetermined outlet but a random outlet or a random outlet from among those extending, for example, in a desired call direction, another suitable outlet together with its inlet may be marked in a subsequent routing attempt, so as to ascertain the presence of a suitable trunk line at the intersection. If required, the routing attempt may be repeated. This system requires provision of special switching means disposed in the network for the path finding and setting, belonging to the coupling field (cross point network), the number of such switching means being proportional to the number of coupling points. It has been suggested, for example, to use for each coupling point a gas diode and a relay comprising three contacts.

The invention shows another way for effecting the selection of routing or connection paths involving at least one end of the coupling field a plurality of inlets and outlets, respectiely. The invention makes it possible to effect considerable reduction of the number of coupling points without adversely affecting the efficiency of the coupling field. The reduction of the number of coupling points results in corresponding reduction of expenditure.

The system according to the invention serves for the selection of routing or connection paths (path finding), extending over multiple-stage coupling fields and involving at least at one end of the coupling field a plurality of inlets or outlets, respectively. The characteristic features of the invention provide for simultaneously marking, by marking potential, the inlets and outlets, respectively, at the coupling field, selecting responsive to consideration, that is, responsive to checking or evaluating, of all idle connection paths lying between the marked inlet and the marked outlet, a routing or connection path between an inlet coupling multiple and an outlet coupling multiple having respectively at least one idle inlet or outlet, and determining with respect to the inlet and outlet coupling multiples thus ascertained, by respective selection operations, one single inlet or outlet, respectively, to be used for routing the desired call.

The switching apparatus of the new system comprises a location or position switch for the respective inlet or outlet coupling stage in which a plurality of inlets or outlets are to be marked, such position switch selecting one position from the marked positions at the ascertained coupling multiple of the corresponding coupling stage.

Figure 1:
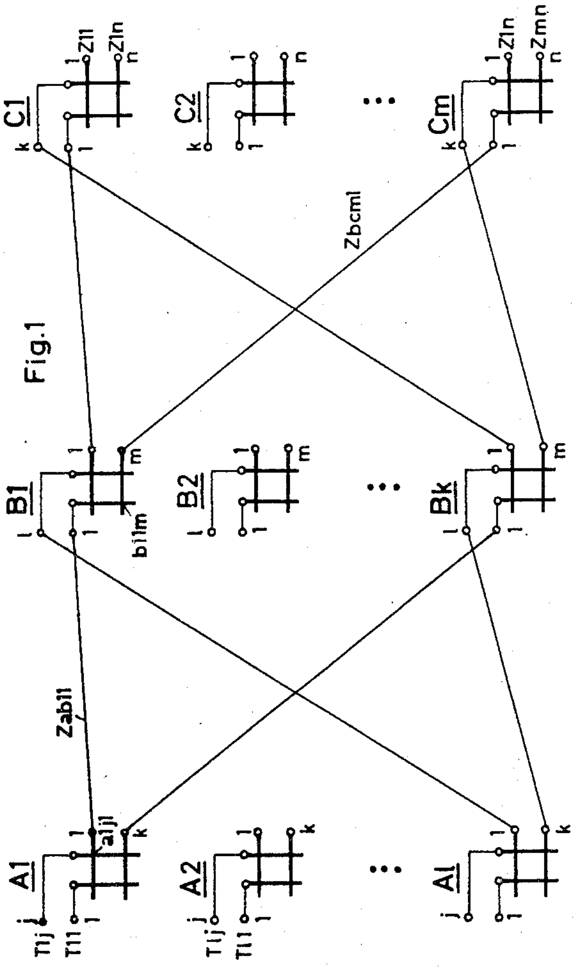
Figure 2:
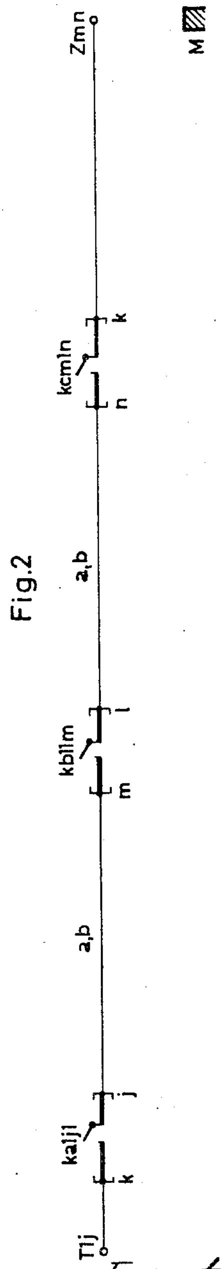
Figure 3:
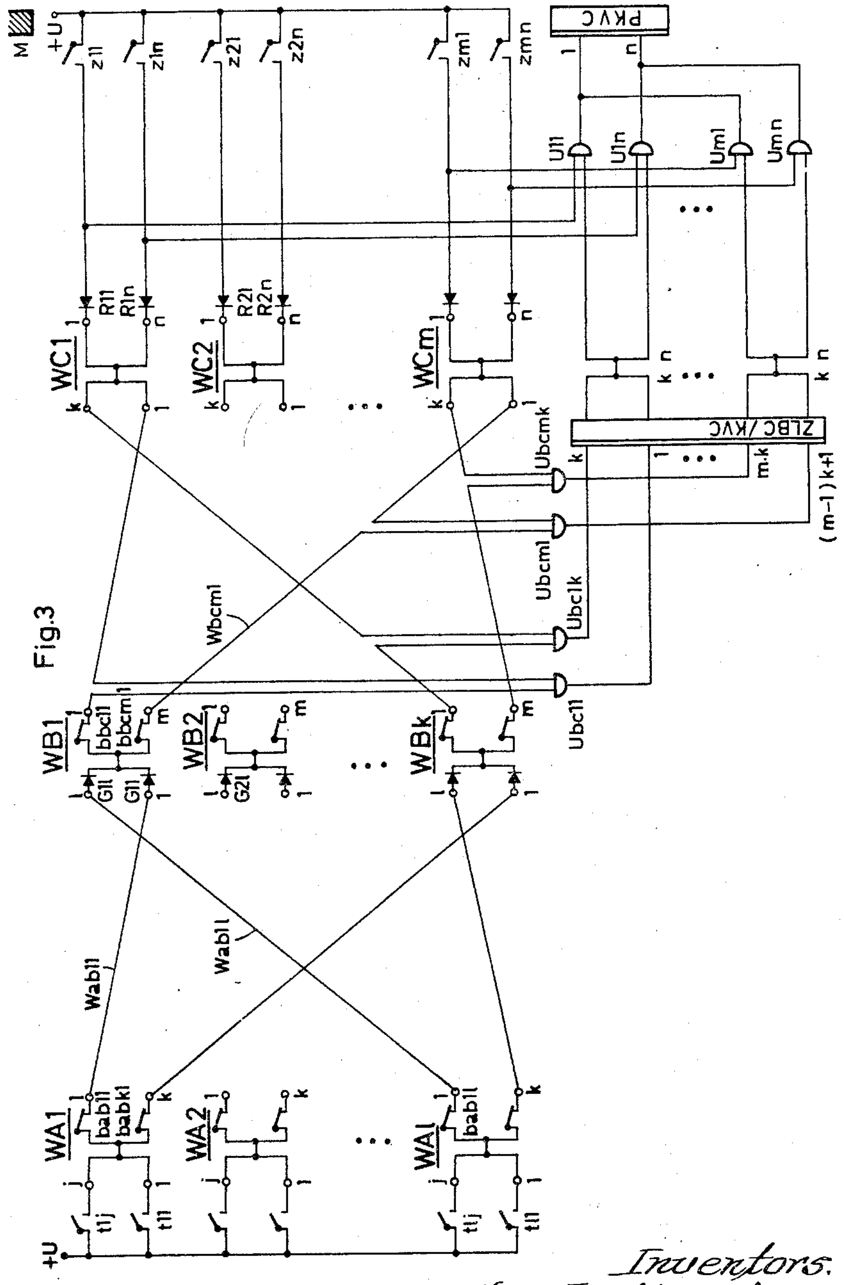
Figure 4:
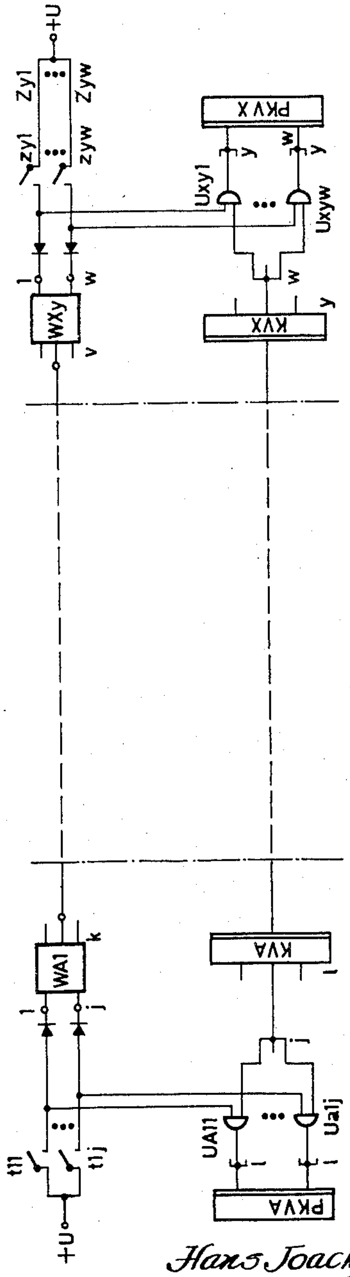

The various features of the system according to the invention, and the advantages resulting therefrom, will become apparent from the description of application possibilities thereof, which will be rendered below with reference to the accompanying drawings. In the drawings, FIG. 1 shows a simple grouping plan for a three-stage coupling field or cross point network;

FIG. 2 indicates the course of the speech current or line conductors *a*, *b*, in the coupling field, for a connection path extending between an inlet and an outlet of such coupling field;

FIG. 3 illustrates a network alloted to or associated with a three-stage coupling field for path finding, in connecting with switching apparatus for effecting the selection of routing or connection paths according to the invention;

FIG. 4 indicates in general manner the use of the system according to the invention in connection with coupling fields comprising as many coupling stages as desired; and FIG. 5 shows how FIGS. 1, 2, 3 are to be arranged for reading the circuits; letter designating index marks which are to be joined in such arrangement of FIGS. 1, 2, 3.

The structure of a coupling field or cross point network (FIG. 1) and the disposition of the line conductors (FIG. 2) will be explained first.

FIG. 1 shows a three-stage coupling field with coupling stages A to C. Each coupling stage contains a plurality of coupling multiples, each coupling multiple being realized by a switch which may be of the crossbar, coordinate, cross coil or relay type and the like. For example, the coupling stage A contains the coupling multiples or switches A1 to A*l*, coupling stage B contains coupling multiples or switches B1 to B*k*, etc. The coupling multiples or switches of each stage are in this example alike. The inlets of the coupling field are at the coupling stage A, being at the same time the inlets of the coupling multiples or switches of this coupling stage. Each coupling multiple of the coupling stage A is provided with inlets *j* and outlets *k*. Each switch of this coupling stage is connected with each switch of the stage B by way of trunk lines. The coupling stage B accordingly has *k* switches or multiples each with *l* inlets. Each inlet of the coupling field therefore can be extended to each coupling multiple or switch of the stage B. The disposition of parts continues in this manner throughout the coupling field. The outlets of the multiples or switches of the stage C constitute the outlets of the coupling field. The coupling multiples or switches are merely schematically indicated and the trunk lines are shown only in part. At the crossing points of the rows (horizontal) and of the columns (vertical), of the multiples, there are disposed contacts in the corresponsing multiple switches, such contacts being respectively associated with or allotted to the respective coupling points, and being referred to as coupling point contacts or cross point contacts.

Thus, for example, as shown in FIG. 2 in the switch or coupling multiple A1 there is at the crossing point of the *j*-column and the first line the coupling point *a*1*j*1, to which are allotted coupling point contacts such as *ka*1*j*1. Similarly coupling point contacts *kb*11*m* are allotted to the coupling point *b*11*m* in the switch or coupling multiple B1, etc. These coupling point contacts are disposed in the network of the line (speech current) conductors and in the private conductors, respectively, other similar switching elements being provided at these points in the network of the other conductors.

The grouping plan shown in FIG. 1 represents the scheme according to which the switches or coupling multiples or rather to say the junction points of crossing thereof are interconnected in the various networks by way of trunk lines. The line conductors *a* and *b* of the coupling field are connected over coupling point contacts disposed at crossing points in the switches or coupling multiples. FIG. 2 shows the course of the line conductors *a* and *b* between one inlet and one outlet, there being assumed a particular connection path of many possible connection paths included in the network. A connection path is, for example, determined by the setting, that is, by the closure of the corresponding coupling point contacts incident to the path finding or routing. In FIG. 2, these coupling point contacts are shown in normal open position. The assumed connection path extends from the coupling field inlet T1*j* to the coupling field outlet Z*mn*. The coupling field inlet T1*j* is at the *j* inlet of the multiple switch A1 of the stage A and the outlet Z*mn* is at the *n* outlet of the multiple switch C*m* of the stage C. The connection path extends in this example from the inlet T1*j* over coupling point contact *ka*1*j*1 to the outlet 1 of the multiple switch A1. This junction point accordingly lies at the *j* column and the first line of the switch A1. The multiple symbols shown at the right and left of the contact *ka*1*j*1 indicate that there are always connected several coupling point contacts in the columns and lines of the coupling multiple. The multiple symbol at the left refers to *k* coupling point contacts connected to a column and the multiple symbol at the right refers to *j* coupling point contacts connected to a row. From the contact *ka*1*j*1 extends a trunk line conductor Z*ab*11 to the inlet 1 of the coupling multiple switch B with which is associated the coupling point contact *kb*11*m*. Multiple symbols again indicate the presence of several coupling point contacts corresponding to *kb*11*m*. From the *m* outlet of the coupling multiple switch B1 extends a trunk line Z*bcm*1 to the first inlet of the coupling switch C*m* of the stage C. The connection path extends from there over the coupling point contact *kcm*1*n* to the outlet Z*mn*.

The system according to the invention will first be described in connection with a simple example, with reference to FIG. 3, which shows among others a pathfinder or cross point routing network for a three-stage coupling field. Lines such as W*ab*11 and W*bcm*1 belong to trunk lines in a coupling field according to FIG. 1. These conductors W*ab*11 and W*bcm*1 belong, for example, as pathfinder or routing conductors, to the trunk lines Z*ab*11 and Z*bcm*1 of the coupling field represented in FIG. 1. The switching or circuit parts WA1 . . . WA*l*, WB1 . . . WB*k* and WC1 . . . WC*m* are respectively allotted to the coupling multiples or switches A1 . . . A*l*, B1 . . . B*k* and C1 . . . C*m* of the coupling field. The circuit or switching parts of the routing network include junction points at which the routing conductors terminate which belong to the trunk lines terminating in the respectively associated coupling switches.

At the respective inlets and outlets of the routing network there are provided contacts. The normally open or make inlet contacts *t*11 . . . *t*1*j*, etc., and the normally open or make outlet contacts *z*11 . . . *z*1*n*, *z*21 . . . *z*2*n*, etc., are on one side thereof connected to a voltage source +U, such source constituting the marker potential. Closure of an inlet contact extends the marker potential to mark the inlet allotted thereto as being involved in a call to be routed, and closure of an outlet contact extends the marker potential to designate the outlet to which it is allotted and over which the call is to be extended. Each outlet contact is to be closed only when the corresponding outlet is idle. Accordingly, if there exists a connection extending over the coupling field to one of these outlet contacts, such contact cannot be actuated. The actuation of these contacts is controlled, for example, by means of markers. However, normal contacts (normally closed contacts) may be respectively connected for this purpose with the outlet contacts, in series relationship therewith, and such resting normal contacts may be opened for designating the seizure or busy condition.

There is also provided a trunk line switch ZLBC/KVC the inlets of which are connected to the routing conductors over "And" gates or coincidence circuits U*bc*11 . . . U*bclk*, between the coupling stages B and C, such switch having outlets each of which is allotted to an inlet thereof. The respective outlets cooperate with corresponding outlet contacts *z*11 . . . *zmn*, over further gates or coincidence circuits U11 . . . U*mn*, with respect to a position switch PKVC.

The circuit shown in FIG. 3 represents an example for cases in which there is for a connection one single inlet available while there are a plurality of outlets present. In this example, the single available inlet is assumed to be inlet T1*j* (FIG. 1) with its inlet contact *t*1*j* (FIG. 3) and the outlets are assumed to be the outlets Z11 . . . and the outlets are assumed to be the outlets Z11 . . . Z1*n* and Z1*m* . . . Z*mn* . . . (FIG. 1) with their contacts *z*11 . . . *z*1*n* and *zm*1 . . . *zmn* (FIG. 3). The most common case, namely, building up of a connection involving one of a plurality of inlets and one of a plurality of outlets will be presently explained with reference to FIG. 4.

For the selection of a connection path, the corresponding inlet and the outlets that may be considered are simultaneously marked by closing the inlet contact *t*1*j* and, for example, also closing the outlet contacts *z*11 . . . *z*1*n* and *zm*1 . . . *zmn*. A path between the input coupling multiple or switch to which the input contact *t*1*j* leads and a single outlet coupling multiple or switch at which at least one outlet contact is closed, is thereupon selected. Such selection takes into account (checks) all idle connection paths lying between the inlet connected with the contact *t*1*j* and the outlets connected to the contacts *z*11 . . . *z*1*n* and *zm*1 . . . *zmn*. This may be accomplished by various methods and operations, the operation according to FIG. 3 being only an example which will now be explained more in detail.

In the routing network shown in FIG. 3, there are provided rectifiers at the switching or junction points WB1 . . . WB*k* of the coupling stage B. At the junction WB1 there are the rectifiers G11 . . . G1*l*, serving as uncoupling rectifiers. If the inlet contact *t*1*j* is, for example, closed, the potential +U which is extended over contact *t*1*j* would without these rectifiers also reach the junction WA1, by way of junction WA*l*, normal (normally closed) contact *bab*1*l*, junction WB1, routing conductor W*ab*1*l*, normal contact *bab*1*l*. This would produce an operating condition such as would be present if one of the inlet contacts *tl*1 . . . *tlj* at position WA*l* were closed, and the effect of such condition must accordingly be avoided, which is achieved by the action of the uncoupling rectifiers G11 and G1*l*, the rectifier G1*l* preventing by its blocking action extension of the marking potential at the junction WA*l*. The further rectifiers provided in the circuit operate in corresponding cases similarly. Rectifiers are also provided in connection with the junction points WC1, WC2 . . . WC*m*, namely, rectifiers R11 . . . R1*n* for junction WC1, rectifiers R21 . . . R2*n* for junction WC2, etc., serving for the uncoupling of the outlet contacts connected to the corresponding junction points. The normal contacts such as *bab*11 . . . *babk*1 of the junction WA1 and corresponding normal contacts at other junctions are closed when the routing conductors (trunk lines) connected thereto are idle, while being open when the corresponding trunk lines are busy, thus serving to signal the operating condition of the trunk lines, idle or busy, to the respectively associated routing points. The manner in which these contacts are operatively actuated does not form part of the invention; they may be actuated, for example, by relays included in the private conductors of the corresponding trunk lines. Thus, for example, the normal contact *bab*11, cooperating with the routing conductor W*ab* 11, will be open when the trunk line Z*ab*11 (FIG. 1) belonging to the routing conductor W*ab*11

(FIG. 3) is busy and, similarly, the normal contact *bbcm1* will be open when the trunk line *Zbcm1* (FIG. 1) belonging to the routing conductor *Wbcm1* (FIG. 3) is busy.

Upon closure of the inlet contact *t1j*, the potential +U will be extended to the junction point *Wa1* and from there to junction points of the coupling stage B over the closed resting contacts *bab11* . . . *babk1* which belong to idle trunk lines extending between the coupling stages A and B. The routing conductors extending from the latter junction points and belonging to idle trunk lines are similarly placed on the marker potential +U over the corresponding normal contacts. The outlet contacts *z11* . . . *z1n* and *zm1* . . . *zmn* have been assumed to be closed. The marking potential +U is accordingly extended from the outlet side of the coupling field over the junction points WC1 and W*Cm* to the routing conductors connected thereto which belong to trunk lines disposed between the coupling stages B and C, such routing conductors having been marked previously from the other (incoming) side thereon. Some of these conductors are accordingly marked from both sides or ends of the coupling field, namely those which lie along idle connection paths between the marked inlet T1*j* and the marked outlets Z11 . . . Z1*n* and Z*m*1 . . . Z*mn*. All these connection paths are being considered incident to the routing, that is to say, they are checked or evaluated for their idle or busy operating conditions. Those of the inlets of the trunk line switch ZLBC/KVC which belong to routing conductors marked on both sides and therefore belonging to suitable trunk lines, are now marked by means of the "And" gates or coincidence circuits connected in the routing conductors between the coupling stages B and C. As a consequence of the selection operation executed by the switch ZLBC/KVC, one of the outlets belonging to the marked inlets, will likewise be marked. This marking designates the trunk line, assumed to be line *Zbcm1* (FIG. 1) having the routing conductor *Wbcm1* (FIG. 3), extending between the coupling stages B and C, which is to be used as a connection path. This trunk line corresponds to a certain outlet coupling multiple or switch, namely, the coupling multiple switch in which it terminates, in the present case the outlet coupling multiple switch C*m* (FIG 1) with the junction point WC*m* (FIG. 3) which is cooperatively associated therewith or part thereof.

Other means may of course be used for determining the inlet and outlet coupling multiples. The means used must, however, satisfy the requirement according to which all connection paths lying between the corresponding inlet and outlet coupling multiples are considered, that is, checked or evaluated for idle and busy condition in the operation. Systems suitable for use in connection with as many coupling stages as desired are, for example, described in copending application Serial No. 762,656, filed September 22, 1958.

The corresponding inlet coupling field, and a particular outlet coupling field at which outlets are marked, have been determined by the above described selection operation. A single idle outlet for the desired connection path, extending from the outlet coupling field, is now determined by a further selection operation. The outlet position switch PKVC is provided for this purpose, the inlets of which are operatively affected by the outlets of the trunk line switch ZLBC/KVC, over the "And" coincidence circuits U11 . . . U*mn*, and the outlet contacts *z11* . . . *zmn*.

The outlets of the switch ZLBC/KVC which belong to trunk lines of the same coupling multiple switch in the coupling stage C are combined. In the illustrated example, the trunk *Zbcm1* (FIG. 1) will be selected, such trunk line extending to the coupling multiple switch C*m*, the routing conductor and the junction point corresponding thereto being indicated in FIG. 3 by *Wbcm1* and WC*m*, respectively. Since this coupling multiple switch has *k* inlets, the respectively associated *k* outlets of the trunk line switch ZLBC/KVC are combined as indicated by a multiple circuit symbol. Its other outputs are combined in similar manner. At the points corresponding to the multiple circuit symbol, there are connected further switching means, namely, "And" coincidence circuits U11 . . . U*mn*, the number of such coincidence circuits corresponding to the number of outlets of the associated coupling multiple switch. Due to the selection of the trunk line *Zbcm1* (routing conductor *Wbcm1*) and the marking of the corresponding outlet of the trunk switch ZLBC/KVC, only the coincidence circuits connected to this outlet are marked at one input thereof. These are the coincidence circuits U*m*1 . . . U*mn*. The coupling multiple switch C*m* (FIG. 1) has *n*-outlets and to the marked outlet of the switch ZLBC/KVC are accordingly connected the *n*-coincidence circuits U*m*1 . . . U*mn*, each with one input thereof. Since the outlets of the trunk line switch ZLBC/KVC are combined in coupling multiple fashion, operating in this manner with respect to further switching means, the trunk line switch would have had to have only as many outlets as there are coupling multiples. It will moreover be realized that, so far as the selection of a predetermined outlet in this coupling stage is concerned, switches, that is, coupling multiple switches, could be used at the fixed outlet coupling multiple, which would merely designate (mark) the corresponding coupling multiple. As already noted, further "And" coincidence circuits are connected in analogous manner to the other outputs of the switch ZLBC/KVC. The outlets of all these coincidence circuits U11 . . . U*mn* are connected with the outlet position switch PKVC for the coupling multiple of the coupling stage C, such position switch having inlets corresponding in number to the maximum number of outlets at a coupling multiple in the respective stage. There are *n* outlets and the position switch therefore has likewise *n* inlets. At each inlet there are connected all the coincidence circuits belonging to the same places (position) among the outlets at the coupling multiples. Each inlet of the position switch therefore is allotted to a position among these outlets. Since the coupling stage C has *n* coupling multiples or switches, *n* coincidence circuits will operate with respect to each input.

The outputs of these coincidence circuits are now marked which, on the one hand belong to the outlets of the coupling multiple C*m*, that is, to the coupling multiple designated by the selection operation in the trunk line switch and which belong, on the other hand, to groups of outlets of the coupling field designated by marking potential, that is, to the group of outlets Z11 . . . Z1*n* and Z*m*1 . . . Z*mn*. The position switch PKVC selects one of the positions the corresponding inlet of which had been marked at the switch.

There is in an outlet coupling multiple only one outlet contact at each place which constitutes a single position outlet of the coupling field and provides at the same time a connection path between the corresponding inlet of the coupling field and a plurality of outlets thereof, whereby all idle connection paths lying between the corresponding inlet and the outlets had been considered, that is, checked or evaluated for idle or busy condition in extending the connection. The switching through of this connection path by setting the coupling point contacts disposed in the course thereof, is of no particular importance for the invention; it may be suitably effected by causing energization of the setting means provided therefor, depending upon the position of the corresponding inlet and outlet contacts and depending upon positions of the connecting path determined by the selection thereof.

This procedure for selecting connection paths may be advantageously used, for example, when one inlet is to be connected with one of a plurality of outlets belonging to the same connection device. If one would thereby proceed in accordance with a previously known system (for example, the system described in United States Patent No. 2,686,837 or 2,655,559), an attempt at extending a connection could be made involving marking of the corresponding inlet and one of the possible outlets.

As already explained, such an attempt at extending a connection may be unsucessful because the corresponding outlet cannot be reached by way of the coupling field since its connection paths are blocked by other connection paths set therein. The attempt at extending a connection must be repeated by way of a second outlet of the same connection apparatus. If there are very many outlets to be considered and very many connection paths already set in the coupling field, many attempts may be required until one is finally successful. However, the time that is available is limited by the time that must be allowed for selection operations. Accordingly, only a limited number of attempts at extending a connection can be undertaken and many connections may be lost. In the system according to the invention, all outlets that might be available are evaluated simultaneously. If there is an idle connection path present at all between the inlet and the corresponding outlets, it will be found incident to the first connection attempt. An auxiliary selection is carried out with the position switch, requiring additional time; however, the corresponding selection operation is effected only with respect to a few units, namely, the positions proper, and is with the use of switching means of the same kind considerably shorter than the repetition of an entire connection attempt. If the number of errors is permissible, in the use of the system according to the invention, corresponding to the number of errors considered otherwise permissible, the number of coupling points in the coupling field may be correspondingly reduced. Since the system according to the invention takes care of a considerably greater number of connection possibilities than prior systems, a substantial reduction of the number of coupling points may be admitted. This results advantageously in a considerable reduction of expenditure.

Due to the symmetry of conditions provided by the invention, it is possible to mark by marking potential one outlet and several inlets instead of one inlet and several outlets, so as to select a possible connection path. In the operation of such coupling field, call finders and storage devices must be provided as a matter of course so as to serve successively a subscriber demanding extension of a call. It may happen that several subscribers place calls simultaneously requiring extension over a given outlet. The system according to the invention permits even for such cases establishment of a connection for one of these subscribers at a minimum time or by the use of a coupling field with a minimum number of coupling points.

As previously mentioned, systems have been proposed for the hunting selection and extension of idle connection paths in a coupling field with a desired number of coupling stages. In these systems, selectors may be provided in the routing network, for determining a coupling multiple in the outlet coupling stage as well as in the inlet coupling stage. If these switches are present in the corresponding stages, several inlets and outlets may be simultaneously marked at the coupling field when it is desired to build up a connection between one of the inlets and one of the outlets. Incident to a connection attempt, all possibilities concerning the connection paths are simultaneously evaluated. The possibility to build up connections in this manner has practical significance, for example, when several inlets are in waiting condition with respect to a connection to be extended over the same connection device. If the selection is in such case effected in a manner as described with reference to FIG. 3, it may happen incident to a connection attempt involving the marking of a given inlet and corresponding outlets, that the connection is not effected, because of blocking of the connection paths extending to the inlet, despite the fact that connection possibilities might be present with respect to at least one of the remaining inlets. However, if all of the inlets and outlets that might be considered are simultaneously marked, an available connection path, if at all present, will be found immediately at the first connection attempt, and such path can thereupon be set. A saving of time is thereby likewise effected since only one connection attempt is required. If failures, that is, losses of connections are permissible, the number of coupling points in the coupling field might be reduced. It is understood, of course, that other operating conditions for the coupling fields might arise, in which it is suitable to provide for simultaneous marking of inlets and outlets.

An example for the selection of a connection path will now be explained with reference to FIG. 4, assuming that a plurality of inlets and outlets are to be marked simultaneously. The figure shows only part of the inlet coupling stage A and the outlet coupling stage X of the corresponding coupling field. In this network, the inlets of the coupling field operating with respect to the coupling multiple A1, which has *j* inlets, is represented by the contacts *t*11 to *t*1*j*. These contacts are actuated responsive to calls being present at the corresponding inlets. The illustrated routing network shows in schematic manner switching means at the places at which there are coupling multiples in the coupling field according to FIG. 1. For example, the coupling multiple A1 of FIG. 1 is represented in FIG. 4 by the switching means WA1. A position switch PKVA for the coupling multiples of the coupling stage A is also shown. The "And" coincidence circuits U*a*11 to U*a*1*j* belong to the coupling multiple A1; they may be marked by way of the associated contacts *t*11 . . . *t*1*j* and the outlet of the coupling multiple switch KVA allotted to the coupling multiple A1. The remaining coupling multiples and respectively associated "And" coincidence circuits are not shown in FIG. 4 since this figure is intended to give only part of the entire circuit. The coupling multiple switch KVA is incident to the routing operated and is assumed in this example to have determined the coupling multiple A1. The connection path accordingly extends over the coupling multiple A. Between the coupling stage A and the coupling stage X are disposed a desired number of not illustrated coupling stages. Of the outlet coupling stage X is illustrated only the coupling multiple X*y* with *w* outlets. Only the first and the last of the associated contacts *zy*1 . . . *zyw*, serving for the marking of the outlets, are indicated. The coupling multiple switch KVX and the position switch PKVX are also shown. Only the first and the last of the coincidence circuits U*xy*1 . . . U*xyw* are indicated. The structure of the inlet coupling stage A and the outlet coupling stage X corresponds to the structure of the output coupling stage C which is shown in detail in FIG. 3.

In the selection of a connection path to be considered, inlets and outlets of the coupling field are simultaneously marked by marking potential. This may involve several inlets lying in the coupling multiple A1 and several outlets lying in the coupling multiple X*y*. The contacts belonging to the inlets and outlets, which are to be marked by marking potential, are closed. This releases in the routing network of the coupling field a path finding (routing) operation, in the course of which is established a connection path between a given coupling multiple of the inlet coupling stage A and the outlet coupling stage X involving certain path portions. This connection path begins with the coupling multiple A1 and is assumed to end at the coupling multiple X*y*. It is now also necessary to determine a given inlet at the coupling multiple A1 and a given outlet, for example, Z*yw*, at the coupling multiple X*y*. This is accomplished in the previously described manner by means of the position switches PKVA and PKVX. The setting of a defined connection path between the given inlet and outlet may thereafter be effected. The setting as such is an operation separate from the routing. It may be carried out in diverse manner in accordance with the switching means provided for the setting. Such setting is not considered part of the invention and details thereof are therefore omitted. It is understood, of course, that all inlets and all outlets of the coupling field may be simultaneously marked incident to the selection of a connection path for satisfying the requirements posed by a connection problem.

In the explanations rendered in the foregoing, there was assumed a certain coupling field constructed according to FIG. 1. In such coupling field, the coupling multiples provided in the coupling stages, are similar one with respect to the other. The multiples may, however, be constructed differently, for example, by omitting the line or column arrangement. The coupling field may on the other hand be constructed in more complicated manner, for example, by staggering neighboring coupling stages, providing for a different number of outlets of a preceding coupling stage as compared with the number of inlets of a succeeding coupling stage. Neighboring coupling stages may also be arranged in coupling groups. The routing system proposed in copending application Serial No. 762,656, filed September 22, 1958, is applicable for desired numbers of coupling fields and provides for a predetermined inlet coupling field and a predetermined outlet coupling field taking into account all connection paths that have to be considered. The portions of the connection paths in a routing system, for determining the connection path to be used, need not be trunk lines; they may, for example, correspond to coupling multiples.

Changes may be made within the scope and spirit of the appended claims which define what is believed to be new and desired to have protected by Letters Patent.

We claim:

1. A system for routing connecting paths incident to the extension of telephone connections and the like, over a multiple stage coupling field having a plurality of coupling stages including a first coupling stage and a last coupling stage and at least one intermediate coupling stage, each coupling stage having a plurality of coupling multiple switches, trunk lines which are to be utilized for the routing of connections extending between the switches of said coupling multiple stages, and having inlet means for the switches of the first coupling stage for receiving connections which are to be routed and outlet means accessible to the switches of the last coupling stage for extending connections therefrom after the routing thereof over a connection path involving selected available trunk lines, comprising means responsive to appearance upon given inlet means, of a connection which is to be routed, for placing marking potential on said inlet means so as to mark such inlet means a being busy, means for simultaneously placing marking potential on idle outlet means so as to likewise mark such outlet means as being busy, means for evaluating all idle trunk lines constituting available connection paths extending between said marked inlet and outlet means and selecting a suitable connection path for routing the corresponding connection, and means for thereupon selecting at a coupling multiple switch of said first coupling stage the marked inlet means and at a coupling multiple switch of the last coupling stage the marked outlet means for connection thereof to the selected connection paths.

2. A system and cooperation of parts according to claim 1, comprising a position switch for the respective coupling multiple switches of said first and said last coupling stages for selecting respectively one of a plurality of inlet and outlet means marked in the corresponding switches.

3. A system and cooperation of parts according to claim 2, comprising a switch for marking a coupling multiple switch in the respective first and last coupling stages, said switch having outlets corresponding in number to the number of coupling multiple switches in the respective stages, said switch marking incident to the selection operation one of its outlets, a plurality of And- coincidence circuits having respectively first inputs respectively allotted to positions of the corresponding coupling multiple switch, each outlet of said switch being connected with said first input of one of said coincidence circuits, said coincidence circuits having respectively second inputs connected to the corresponding positions, the outputs of said coincidence circuits operating with respect to the respective position switches, each of said position switches having inputs corresponding in number to the maximum number of positions at said coupling multiples, the inputs of said position switches being connected in common to the coincidence circuits belonging to the same positions at the coupling multiple switches of the corresponding coupling stages.

References Cited in the file of this patent

UNITED STATES PATENTS

| | | |
|---|---|---|
| 2,741,663 | Oberman | Apr. 10, 1956 |
| 2,859,283 | Dunlap | Nov. 4, 1958 |
| 2,882,344 | Henquet et al. | Apr. 14, 1959 |